(12) United States Patent
Pedder et al.

(10) Patent No.: US 12,280,810 B2
(45) Date of Patent: Apr. 22, 2025

(54) METHOD AND SYSTEM FOR MULTI-FUEL ENGINE

(71) Applicant: Transportation IP Holdings, LLC, Norwalk, CT (US)

(72) Inventors: Jacob Kenneth Pedder, State College, PA (US); James Robert Mischler, Lawrence Park, PA (US); Ajith Kuttanair Kumar, Ashburn, VA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/326,591

(22) Filed: May 31, 2023

(65) Prior Publication Data

US 2023/0415791 A1    Dec. 28, 2023

Related U.S. Application Data

(60) Provisional application No. 63/366,808, filed on Jun. 22, 2022.

(51) Int. Cl.

| | |
|---|---|
| *B61C 7/04* | (2006.01) |
| *B60L 58/12* | (2019.01) |
| *B60L 58/13* | (2019.01) |
| *B60L 58/14* | (2019.01) |
| *B60L 58/15* | (2019.01) |
| *B60W 20/13* | (2016.01) |
| *F02D 19/06* | (2006.01) |
| *F02D 19/08* | (2006.01) |

(52) U.S. Cl.
CPC ............... *B61C 7/04* (2013.01); *B60W 20/13* (2016.01); *F02D 19/061* (2013.01); *F02D 19/081* (2013.01); *B60L 58/12* (2019.02); *B60L 58/13* (2019.02); *B60L 58/14* (2019.02); *B60L 58/15* (2019.02); *B60W 2300/44* (2013.01); *B60W 2510/244* (2013.01); *B60W 2710/0616* (2013.01)

(58) Field of Classification Search
None
See application file for complete search history.

(56) References Cited

U.S. PATENT DOCUMENTS

| | | | | |
|---|---|---|---|---|
| 8,214,097 | B2 * | 7/2012 | Severinsky | B60L 58/12 |
| | | | | 701/84 |
| 9,002,551 | B2 * | 4/2015 | Krafzig | B60W 30/1882 |
| | | | | 180/65.23 |
| 10,060,362 | B2 * | 8/2018 | Miller | B60W 20/10 |
| 11,598,249 | B1 * | 3/2023 | Lavertu | F02D 41/3094 |
| 11,982,241 | B2 * | 5/2024 | Lavertu | F02D 19/081 |
| 2017/0321616 | A1 * | 11/2017 | Miller | F02D 41/0025 |

(Continued)

FOREIGN PATENT DOCUMENTS

| | | | | | |
|---|---|---|---|---|---|
| CN | 109278765 | A | * | 1/2019 | ............ B61C 17/12 |
| CN | 113928138 | A | * | 1/2022 | |

(Continued)

*Primary Examiner* — Kevin R Steckbauer
(74) *Attorney, Agent, or Firm* — K&L Gates LLP

(57) ABSTRACT

Methods and systems are provided for a multi-fuel engine. In one example, a method includes operating engines of rail vehicles at a desired substitution ratio to recharge an energy storage device of a rail vehicle operating in an all-electric mode to meet a requested total power.

18 Claims, 6 Drawing Sheets

(56) References Cited

U.S. PATENT DOCUMENTS

| | | | | |
|---|---|---|---|---|
| 2023/0081493 A1* | 3/2023 | Lavertu | ............... | F02D 41/3094 |
| | | | | 60/602 |
| 2023/0193841 A1* | 6/2023 | Lavertu | ................ | F02D 31/002 |
| 2023/0415791 A1* | 12/2023 | Pedder | ................. | B60W 10/06 |

FOREIGN PATENT DOCUMENTS

| | | | | | |
|---|---|---|---|---|---|
| CN | 113928138 B | * | 5/2023 | | |
| CN | 116335835 A | * | 6/2023 | ............... | B61C 5/00 |
| DE | 102018128447 A1 | * | 5/2019 | ............... | B60K 6/26 |
| DE | 102023115233 A1 | * | 12/2023 | ............ | B60W 20/13 |
| JP | 5801999 B2 | * | 10/2015 | .......... | B60L 15/2045 |
| RU | 2683589 C2 | * | 3/2019 | ............ | B60K 6/445 |

* cited by examiner

METHOD AND SYSTEM FOR MULTI-FUEL ENGINE

CROSS REFERENCE TO RELATED APPLICATIONS

The present application claims priority to U.S. Provisional Application No. 63/366,808, entitled "METHOD AND SYSTEM FOR MULTI-FUEL ENGINE", and filed on Jun. 22, 2022. The entire contents of the above-listed application are hereby incorporated by reference for all purposes.

TECHNICAL FIELD

Embodiments of the subject matter disclosed herein relate to a multi-fuel engine, and more specifically, to adjusting operating conditions to promote higher substitution ratios.

DISCUSSION OF ART

Internal combustion engines may include compression-ignition and/or spark-ignition engines. The engine may combust multiple types of fuel. The engine may include multiple injectors positioned to inject directly into a combustion chamber and into an intake port of the engine. A substitution ratio of the engine fueling may be adjusted to adjust engine power output, emissions, engine temperature, and so forth. Some fuels, while energy dense, may be prone to generating poor combustion conditions due to a high heat of vaporization, poor mixing, and/or low flame speed. It may therefore be desirable to have methods and systems for fuel combustion which differ from those that are currently available.

BRIEF DESCRIPTION

In one embodiment, a method for a vehicle system having a multi-fuel engine and a battery includes in a first mode of operation, adjusting a substitution ratio (SR) and drawing from the battery; and in a second mode of operation, supplying charge to the battery to maintain tractive effort and a desired SR.

In another embodiment, a system includes a train comprising a plurality of vehicles, each vehicle of the plurality of vehicles comprising an engine and an electric motor. The system further includes a controller with computer-readable instructions stored on non-transitory memory thereof that when executed enable the controller to in response to a requested power being less than a threshold power, intrusively increase a total power output of the plurality of vehicles to a value greater than the requested power and recharge a state-of-charge (SOC) of at least one battery of the plurality of vehicles via excess power generated by the plurality of vehicles.

In a further embodiment, a method for a train comprising a plurality of vehicles, includes operating at least one of the plurality of vehicles in an all-electric mode to meet a total requested power of the consist, and operating a remaining plurality of vehicles at idle with a desired substitution ratio in response to a state-of-charge (SOC) of the at least one rail vehicle being less than a threshold SOC.

DETAILED DESCRIPTION

Figure 1:
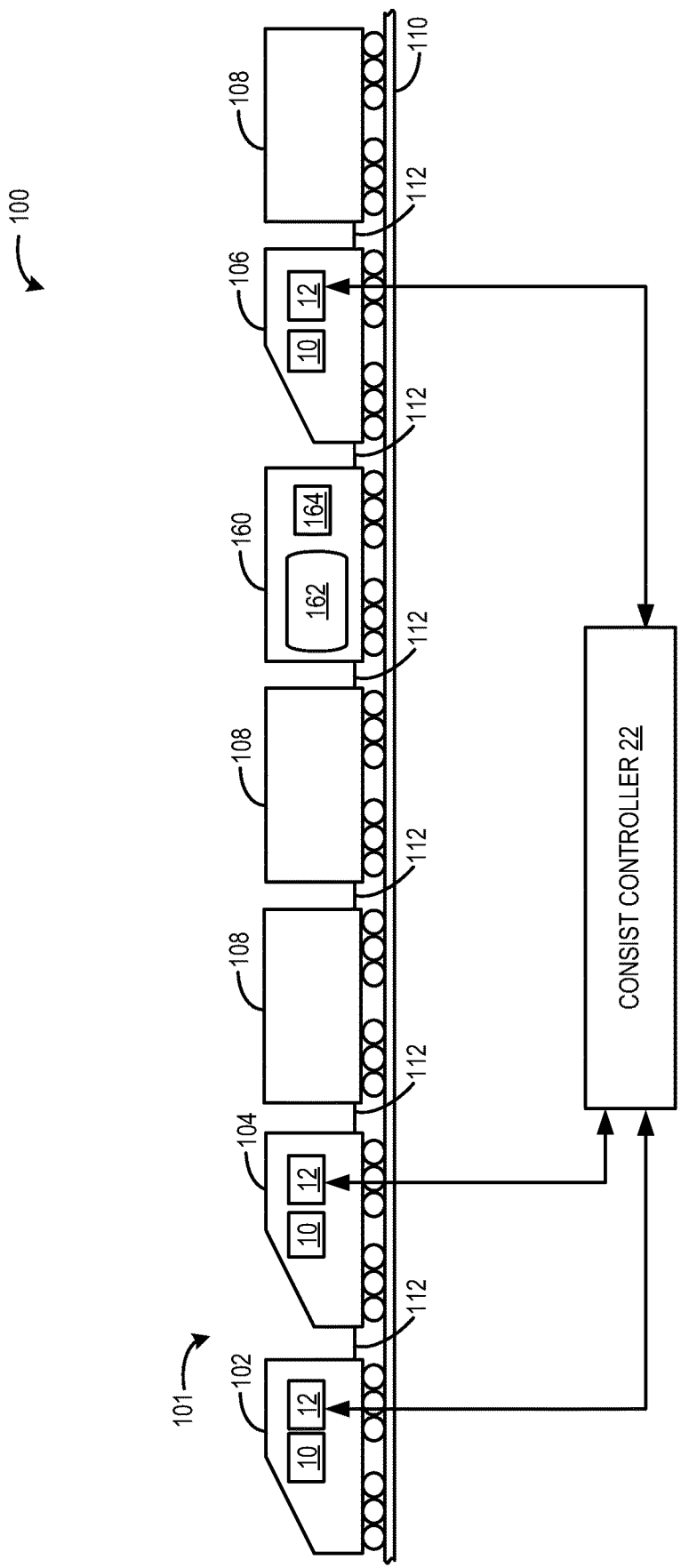
FIG. 1 shows an example embodiment of a train including a vehicle of a consist.

Embodiments of the invention are disclosed in the following description and may relate to methods and systems for operating a plurality of vehicles of a train. Each of the plurality of vehicles may include an internal combustion engine (ICE) and an electric motor/generator/alternator. The motor/generator/alternator may be coupled to an energy storage device. The ICE may operate via a combination of different fuels as a mixture, and in different proportions relative to each other to form a substitution ratio of one fuel relative to another. These fuels may contain relatively different amounts of carbon. Suitable fuels may be liquid or gas. Suitable fuels may include one or more of gasoline, diesel, alcohol(s), ether(s), ammonia, hydrogen, natural gas, kerosene, syn-gas, and the like. Suitable diesel may include regular/low sulfur, hydrogenation-derived renewable diesel (HDRD), and biodiesel. The plurality of fuels may be a mixture, or may be provided separately into a combustion chamber of the ICE. The substitution ratio of a primary fuel with a secondary fuel may be determined by a controller. The controller may determine and/or control the substitution ratio based at least in part on one or more of a current engine load, a current engine temperature, a current manifold temperature, a current injection timing, and a current air/fuel ratio. The controller may determine and/or control the substitution ratio based at least in part on the fuels that are used in the mixture, and their associated characteristics.

In one embodiment, the substitution ratio may correspond to an injection amount of a fuel with a relatively lower carbon content or zero carbon content (e.g., hydrogen gas or ammonia) relative to a carbon-containing fuel. As the substitution ratio increases, the relative proportion of fuel with the lower or zero carbon content increases and the overall amount of carbon content in the combined fuel lowers. In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to account for the hydrogen and to promote enhanced combustion of the hydrogen. When ammonia is provided, operating conditions may be adjusted to account for the ammonia and to promote enhanced combustion of the ammonia. The substitution in, or out, of a particular fuel, may be accounted for by the controller with reference to specific parameters and properties of the fuel. For example, renewable diesel has relatively different combustion properties than biodiesel. As such, the controller may adjust engine operation by taking into account such differences. Likewise, as more or less hydrogen is introduced into the combustion mixture the controller may adjust engine operation taking into account the combustion behavior of hydrogen.

In one example, operation of the rail vehicle may be planned via a trip planner to reduce carbon emissions over a trip. Reducing carbon emissions may include optimizing operating conditions to promote higher substitution ratios while still meeting a requested power of the train. For a train including a plurality of rail vehicles including a hybrid arrangement wherein an all-electric mode may be used, a method may include selecting a mode including operating at least one rail vehicle of the plurality of rail vehicles in the all-electric mode to meet the requested power and operating other rail vehicles at a desired substitution ratio. In this instance, all-electric means that an energy demand of a vehicle is met entirely using a battery or capacitor. In one embodiment, the all-electric mode may supply power from a fuel cell. In one embodiment, the all-electric mode may supply electric power from an off-board energy source. Other non-ICE power sources are contemplated, such as fly-wheels, compressed air microturbines, and the like. Suitable variations may include combinations of non-ICE power sources for all-electric operation. The electric load met during all-electric operation may, in various embodiments, be for hotel load, for propulsion purposes, additional purposes, or a combination of the foregoing.

In one embodiment, the engine system may combust a mixture of three or more fuels—as an example: diesel, hydrogen, and ammonia. Additionally or alternatively, ethanol may be included in the combustion mixture. In one example, a non-fuel mass of a combustion mixture may be adjusted in response to a substitution ratio. The non-fuel mass may be further adjusted in response to an engine temperature, wherein the non-fuel mass may increase in response to increased engine temperatures during multi-fuel combustion. The non-fuel mass may absorb heat, thereby functioning as a heat sink. The non-fuel mass may allow higher substitution ratios at a higher number of engine loads and operating conditions. In one example, the non-fuel mass is defined as a portion of a combustion mixture that reduces a cylinder temperature. Elements included in the non-fuel mass may function as fuels during some combustion conditions. However, the elements may be provided in a manner to the cylinder such that their ignitability is reduced in order to decrease the cylinder temperature.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. Certain fuels may result in increased engine temperatures or undesired combustion conditions due to a relatively increased or decreased ignitability. To adjust the in-cylinder conditions to replicate single-fuel operation conditions, the non-fuel mass of the cylinders combusting multiple fuels may be adjusted.

Embodiments of the system described herein may include or be applied in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive is used as an example of a mobile platform. Suitable systems may include an engine, a turbocharger, a fuel system, and a controller or control system. Some embodiments may include an aftertreatment system or other emission reduction system. The vehicles can operate singly or may move as a group. A vehicle group may be coupled together mechanically (as in a consist) and/or virtually (as in a platoon or swarm) to coordinate their movements. Virtual coupling includes logically or communicatively coupled vehicles operating under direct or indirect control but are not necessarily mechanically coupled to each other.

Before further discussion of the methods for increasing engine startup efficiency, an example platform in which the methods may be implemented is shown. FIG. 1 depicts an example vehicle system 100. The vehicle system 100 can include a single vehicle or multiple vehicles in a consist. The vehicle system selected for illustration in FIG. 1 is a vehicle group 101 that includes a locomotive and a plurality of other rail vehicles, such as a fuel tender 160 and cars 108, that can run on a track 110. The rail vehicle group may be referred to as a train having plural powered vehicles forming the consist. In the illustrated example, the plurality of powered rail vehicles in consist may include a lead rail vehicle 102 and one or more remote powered rail vehicles 104, 106 that act under the control of the lead vehicle. The plurality of rail vehicles, the fuel tender, and the cars are mechanically coupled to each other through couplers 112. Throttle and braking commands may be relayed from the lead rail vehicle to the remote rail vehicles by a radio link or physical cable, for example.

The rail vehicles may be powered by an engine 10, while the cars may be un-powered. In the illustrated example, the engine is a multi-fuel engine and may combust gaseous and/or liquid fuels or fuels with differing amounts of carbon, and do so in varying ratios of one fuel to another (i.e., the substitution ratio).

The train may include a control system. The control system may include an engine controller 12, and it also may include a consist controller 22. As depicted in FIG. 1, each rail vehicle includes one engine controller, all of which are in communication with the consist controller. The consist controller may be located on one vehicle of the train, such as the lead rail vehicle, or may be remotely located, for example, at a dispatch center. The consist controller can receive information from, and transmit signals to, each of the rail vehicles of the consist. For example, the consist controller may receive signals from a variety of sensors on the train and adjust train operations accordingly. The consist controller may be coupled to each engine controller for adjusting engine operations of each rail vehicle. As elaborated with reference to FIGS. 3-6, each engine controller may determine a current engine condition and adjust a substitution ratio thereof. The substitution ratio may be at least partially adjusted in response to an intake manifold temperature. As described above, the substitution ratio corresponds to a substitution of a primary fuel with one or more alternative fuels. The engine may combust the primary fuel alone in one operating mode. However, in other operating modes the engine may perform multi-fuel combustion. The switch of operating modes may be done, for example, to decrease one or more emission types, decrease combustion costs, increase engine efficiency, accommodate a low availability of one or more fuels, and the like. The primary fuel and the alternative fuels may be selected from the suitable fuels. In one embodiment, the propulsion system may be augmented with a fuel cell and/or an energy storage device that accepts and/or provides electrical energy to traction motors. In particular, the fuel cell may consume the same fuel as one of the fuels that makes up the mixture of fuels for the ICE.

The train may include at least one fuel tender, which may carry one or more fuel storage tanks 162 and includes a controller 164. While the fuel tender may be positioned in front of the remote rail vehicle 106, in other examples it may be in other locations along the train.

Figure 2:
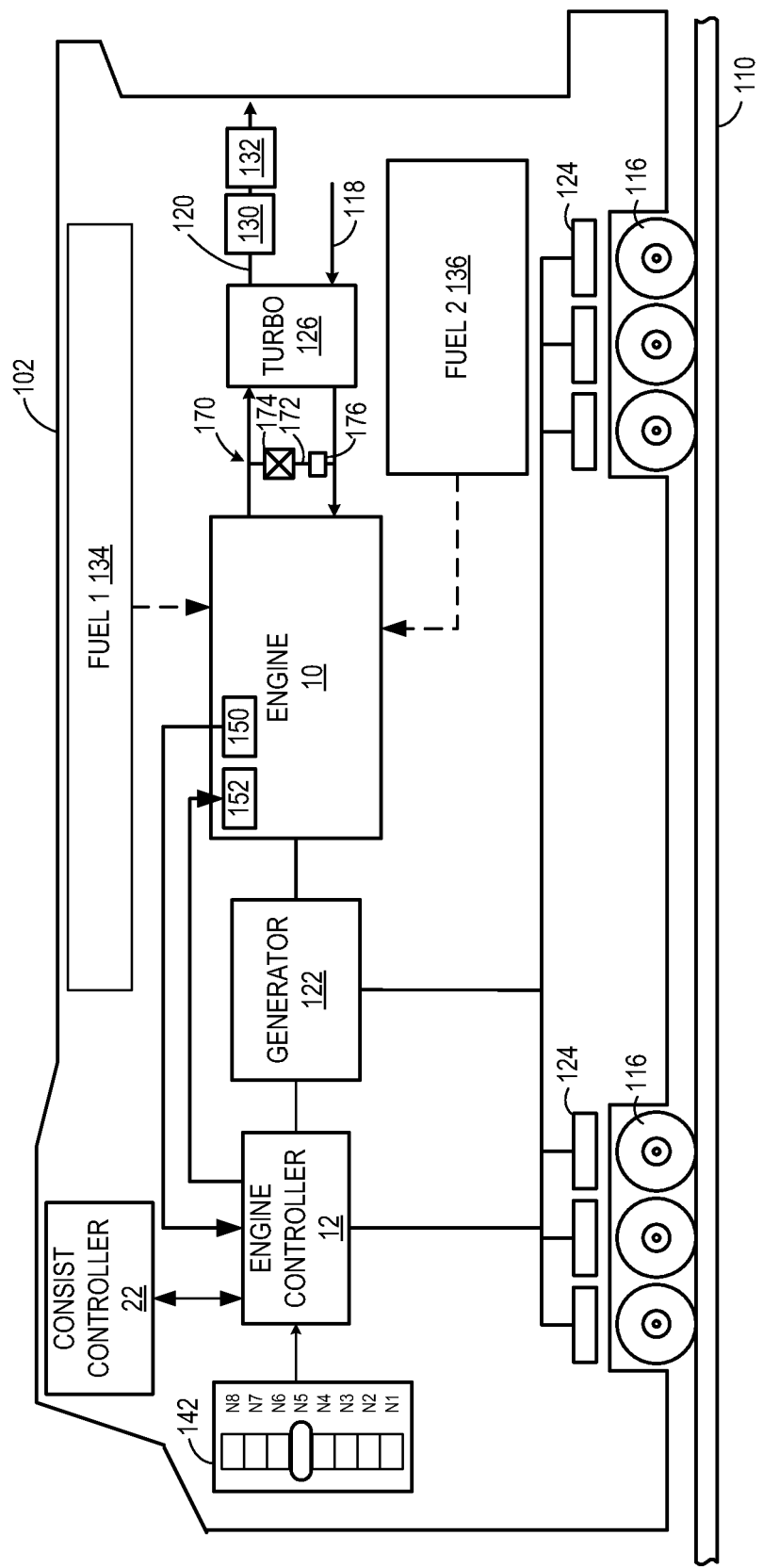
FIG. 2 shows a schematic diagram of an example embodiment of the vehicle from FIG. 1 with a multi-fuel engine.
Figure 3:
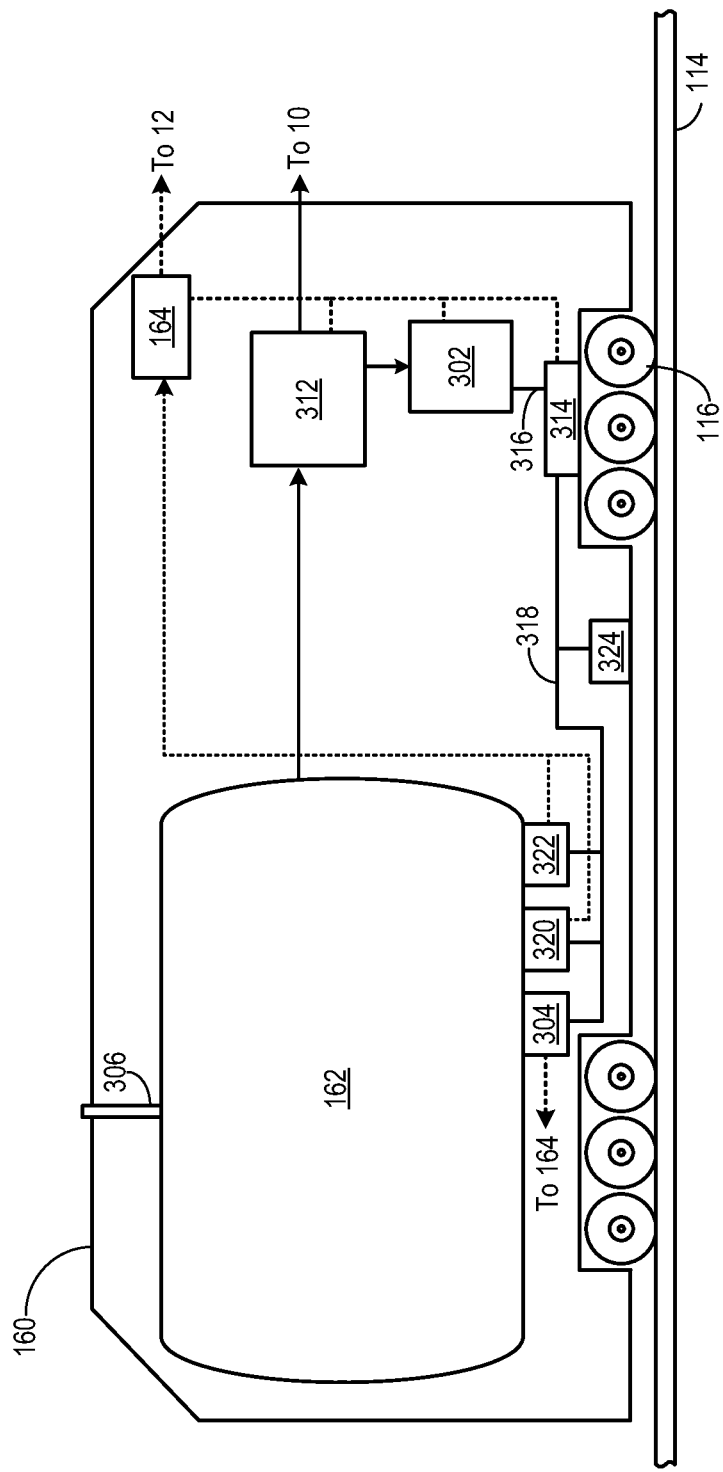
FIG. 3 shows an example embodiment of a fuel tender which may be included in the train of FIG. 1.

In one example, the fuel tender may be non-powered for propulsion, e.g., without an engine or electric traction motors (e.g., electric traction motors 124 shown in FIG. 2). However, in other examples, the fuel tender may be powered for propulsion. For example, as shown in FIG. 3, the fuel tender may include an engine 302). The engine of the fuel tender may combust the fuel stored in the fuel storage tank and/or fuel stored at another vehicle of the train. In one embodiment, an auxiliary engine is included on the fuel tender that can covert fuel, from the tender, into electrical power. Examples may include an Aux Engine and a fuel cell.

The one or more fuel storage tanks of the fuel tender may have a structure suitable for storing a specific type of fuel. In one example, the fuel storage tank may be adapted for cryogenic storage of liquefied natural gas (LNG). As another example, the fuel storage tank may store a fuel in a liquid state at ambient temperature and pressure, such as diesel or ammonia. In yet another example, the fuel storage tank may store a fuel as a compressed gas, such as hydrogen. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the rail vehicles, e.g., as shown in FIG. 2. In addition, in some instances the fuel tender may have a fuel cell system. The fuel cell system may include a fuel cell and one or more tanks of hydrogen.

FIG. 2 depicts an example embodiment of a rail vehicle of the train from FIG. 1, herein depicted as the rail vehicle 102, that can run on the track via a plurality of wheels 116. Power for propulsion/traction of the rail vehicle may be supplied at least in part by the engine. The engine receives intake air for combustion from an intake passage 118. The intake passage receives filtered ambient air from an air filter (not shown). Exhaust gas resulting from combustion in the engine is supplied to an exhaust passage 120. Exhaust gas flows through the exhaust passage, and out of an exhaust stack (not shown) of the rail vehicle.

In one embodiment, the engine operates as a compression ignition engine that can combust at least one type of fuel. In another embodiment, the engine operates as a spark ignition engine similarly that can combust at least one type of fuel. For example, the engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, that can receive a first fuel from a first fuel reservoir 134 and a second fuel from a second fuel reservoir 136.

While the rail vehicle is equipped with two fuel reservoirs in FIG. 2, in other examples, the rail vehicle may include only one fuel reservoir or no fuel reservoir. For example, at least one of the fuel reservoirs may be stored at the fuel tender, e.g., the fuel tender of FIG. 1. Alternatively, a third fuel may be stored at the fuel tender in addition to the first fuel at the first fuel reservoir and the second fuel at the second fuel reservoir of the rail vehicle. In one example, fuels which may be stored at ambient pressure and temperature without any additional equipment or specialized storage tank configurations may be stored at the rail vehicle. Fuels demanding specialized equipment, such as for cryogenic or high pressure storage, may be stored on-board the fuel tender. In other examples, however, the rail vehicle and the fuel tender may each store fuels that do not demand specialized equipment.

The first, second, and third fuels (e.g., any fuels stored on-board the train) may each be any of a number of different fuel types. For example, the types of fuel may include carbon-based fuels, such as diesel; natural gas; methanol, ethanol, other alcohols; ethers, such as dimethyl ether (DME), and others. Alternatively, the fuels may be non-hydrocarbon-based fuels, such as hydrogen, ammonia, and the like.

Additionally, each of the stored fuels may be a gaseous or a liquid phase fuel. Thus, when a compression ignition engine is combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when a spark ignition engine combusts a single fuel type, the engine may consume either a gaseous fuel or a liquid fuel. A multi-fuel spark ignition engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution ratio may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and an ignitibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When engine conditions permit combustion of only a single fuel (either spark ignition or compression ignition), the engine may consume a single liquid phase fuel. For example, the engine may combust diesel, gasoline, ammonia, LNG, or another liquid phase fuel. Similarly, the engine may combust a single gaseous fuel, such as hydrogen, or another gaseous fuel.

Furthermore, a fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as intake-port injection and/or exhaust-port injection. In another example, at least one of the fuels may be introduced to the engine cylinders via direct injection. In yet another example, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing the gaseous fuel, with air and/or EGR, may be desirable via port injection. The fuels may also be premixed when introduced by central manifold injection. Premixing by direct injection is also possible, such as by injection of the gaseous fuel during an intake stroke of the engine cylinders. Additionally or alternatively, a location of injection of one or more fuels may be based on an ignitibility of a fuel. For example, ammonia may be injected indirectly and premixed with boost air and/or EGR to enhance an ignitibility and a vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be injected by port injection or direct injection. Similarly, fuels such as methanol and ethanol may also be either port injected or direct injected. In some instances, the engine may have fuel injectors capable of switching between injection of gaseous fuels and of liquid fuels.

The fuels combusted by the multi-fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. For example, a greater magnitude of premixing hydrogen may be desired at higher loads and a lower magnitude of premixing hydrogen may be desired at lower loads. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidly coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is hydrogen and the second fuel is diesel, premixing of the hydrogen with air, via an injection method using port and/or direct injection, may provide more stable air/fuel mixtures at low engine speeds and smoother engine startups. However, at higher engine speeds, port injection of the hydrogen may increase a likelihood of engine knock. Direct injection of the hydrogen may mitigate knock. Thus, in some examples, combined application of port injection of hydrogen at low engine speeds and direct injection of hydrogen at high engine speeds to mitigate knock may be desirable. Additionally or alternatively, a fuel with a lower ignitibility, such as ammonia, may be premixed with hydrogen to mitigate knock.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution ratios of hydrogen, e.g., substituting for diesel, for example, thereby decreasing hydrocarbon, $NO_x$, and particulate matter emissions during engine operation.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels to provide tractive power to propel the rail vehicle. One example rail vehicle configuration includes one traction motor per wheel. As depicted herein, six pairs of traction motors correspond to each of six pairs of wheels of the rail vehicle.

The rail vehicle may include at least one turbocharger 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The rail vehicle may include an exhaust gas recirculation (EGR) system 170, which routes exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., $NO_x$). The EGR valve may be an on/off valve controlled by the rail vehicle controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the rail vehicle may additionally or alternatively include a low-pressure EGR system, routing EGR from a location downstream of the turbocharger to a location upstream of the turbocharger relative to a direction of exhaust gas flow. Additionally, the EGR system may be a donor cylinder EGR system where one or more cylinders provide exhaust gas only to the EGR passage, and then to the intake. Additionally or alternatively, the donor cylinder EGR system may include routing exhaust gases directly to one or more adjacent cylinders.

The rail vehicle includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF may trap particulates, also known as particulate matter (an example of which is soot), produced during combustion, and may be formed from ceramic, silicon carbide, or a suitable material. In other embodiments, the exhaust gas treatment system may include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

The rail vehicle may further include a throttle 142 coupled to the engine to indicate power levels. In this embodiment, the throttle is depicted as a notch throttle. Each notch of the notch throttle may correspond to a discrete power level. These discrete power levels may be selected as they represent operating sweet-spots for a given engine, thus increasing efficiency may be possible if the engine operation moves from one notch to another. In another embodiment, however, the throttle is infinitely variable and discrete power levels are not identified or used. The power level indicates an amount of load, or engine output, placed on the rail vehicle and controls the speed at which the rail vehicle will travel.

Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the rail vehicle. In one example, a value of the notch setting corresponds to an engine load, wherein a higher value is equal to a higher engine load. In other embodiments, the consist controller may determine a trip plan (e.g., a trip plan may be generated using trip optimization software, such as Trip Optimizer system available from Wabtec Corporation and/or a load distribution plan may be generated using consist optimization software such as Consist Manager system available from Wabtec Corporation) including throttle ("notch") settings based on determined engine and/or rail vehicle operating conditions.

The engine controller may control various components related to or used on the rail vehicle. As an example, various components of the rail vehicle may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of rail vehicle operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the rail vehicle, may receive signals from a variety of engine sensors 150, as further elaborated herein, in order to determine operating parameters and operating conditions, and correspondingly adjust various engine actuators 152 to control operation of the rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the rail vehicle by sending commands to various components such as the electric traction motors, the alternator/generator, cylinder valves, fuel injectors, the notch throttle, etc. Other actuators may be coupled to various locations in the rail vehicle.

The consist controller may include a communication portion operably coupled to a control signal portion. The communication portion may receive signals from rail vehicle sensors including rail vehicle position sensors (e.g., GPS device), environmental condition sensors (e.g., for sensing altitude, ambient humidity, temperature, and/or barometric pressure, or the like), rail vehicle coupler force sensors, track grade sensors, rail vehicle notch sensors, brake position sensors, etc. Various other sensors may be coupled to various locations in the rail vehicle. The control signal portion may generate control signals to trigger various rail vehicle actuators. Example rail vehicle actuators may include air brakes, brake air compressor, traction motors, etc. Other actuators may be coupled to various locations in the rail vehicle. The consist controller may receive inputs from the various rail vehicle sensors, process the data, and trigger the rail vehicle actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all rail vehicles in the train, based on operating conditions. In some conditions, the consist controller may distribute the load unequally, that is, some rail vehicles may be operated at a higher power setting, or higher notch throttle setting, than other rail vehicles. The load distribution may be based on a plurality of factors, such as fuel economy, coupling forces, tunneling operating, grade, etc. In one example, the load distribution may be adapted based on a distribution of the rail vehicle consist, e.g., a positioning of each of the rail vehicles of the rail vehicle consist, across the train. For example, at least one rail vehicle may be positioned at an end of the train and at least one rail vehicle may be positioned at a front of the train. The rail vehicle at the end of the train may push propulsion of the train, and the rail vehicle at the front of the train may pull the train, particularly during uphill navigation. As such, a greater load may be placed on the pushing rail vehicle at the end of the train. The amount of propulsion provided by the individual powered vehicles may be adjusted as the vehicle moves, such as cresting a hilltop, to ensure that intra-vehicle force thresholds or distance thresholds are not exceeded.

Turning now to FIG. 3, an embodiment of the fuel tender of FIG. 1 is shown. As described above, the fuel tender includes the fuel storage tank, the controller, and the engine. The fuel tender may further include a first unit 304, which may be a device for controlling a temperature and pressure within the fuel storage tank. For example, when LNG is stored in the fuel storage tank, the first unit may be a cryogenic unit. The fuel storage tank sizes and configurations may be selected with reference to end use parameters, may be removable from the fuel tender, and may receive fuel from an external refueling station via port 306.

The fuel storage tank may supply fuel to a fuel modification unit 312. The fuel modification unit may control or adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the rail vehicles (e.g., the engines 10 of FIGS. 1 and 2).

By supplying fuel from the fuel storage tank to the rail vehicle engines and the engine of the fuel tender, the fuel may be combusted by the engines distributed across the train. In another non-limiting embodiment, the fuel tender engine may generate electricity that may be delivered to one or more components on-board the fuel tender and/or on-board the rail vehicles. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the rail vehicles.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may also execute code to transmit to and receive communications from the engine controllers on-board the rail vehicles.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other devices and mechanisms for controlling fuel delivery and storage conditions, etc.

Figure 4:
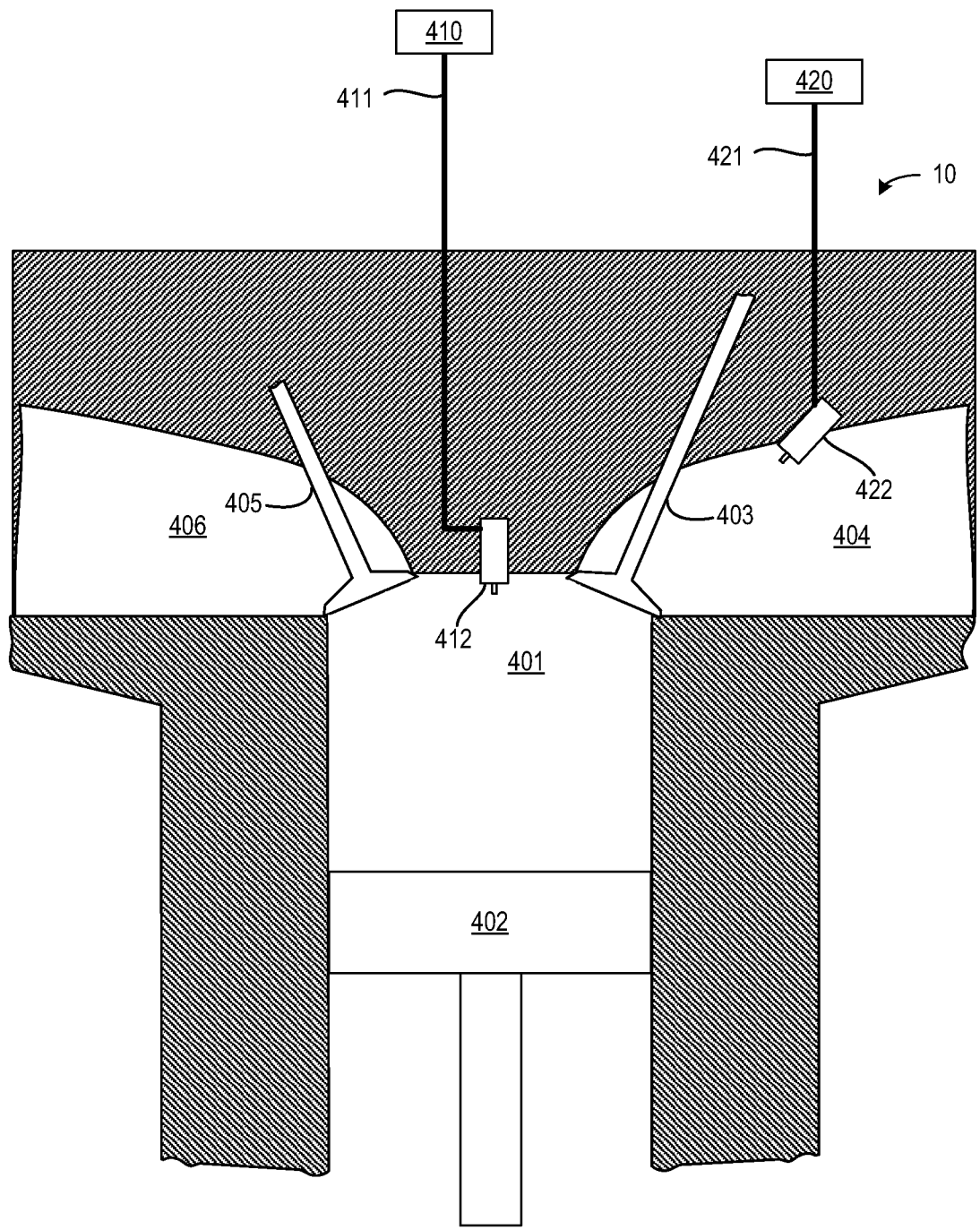
FIG. 4 shows a detailed view of an engine system of a vehicle of the train.
Figure 5:
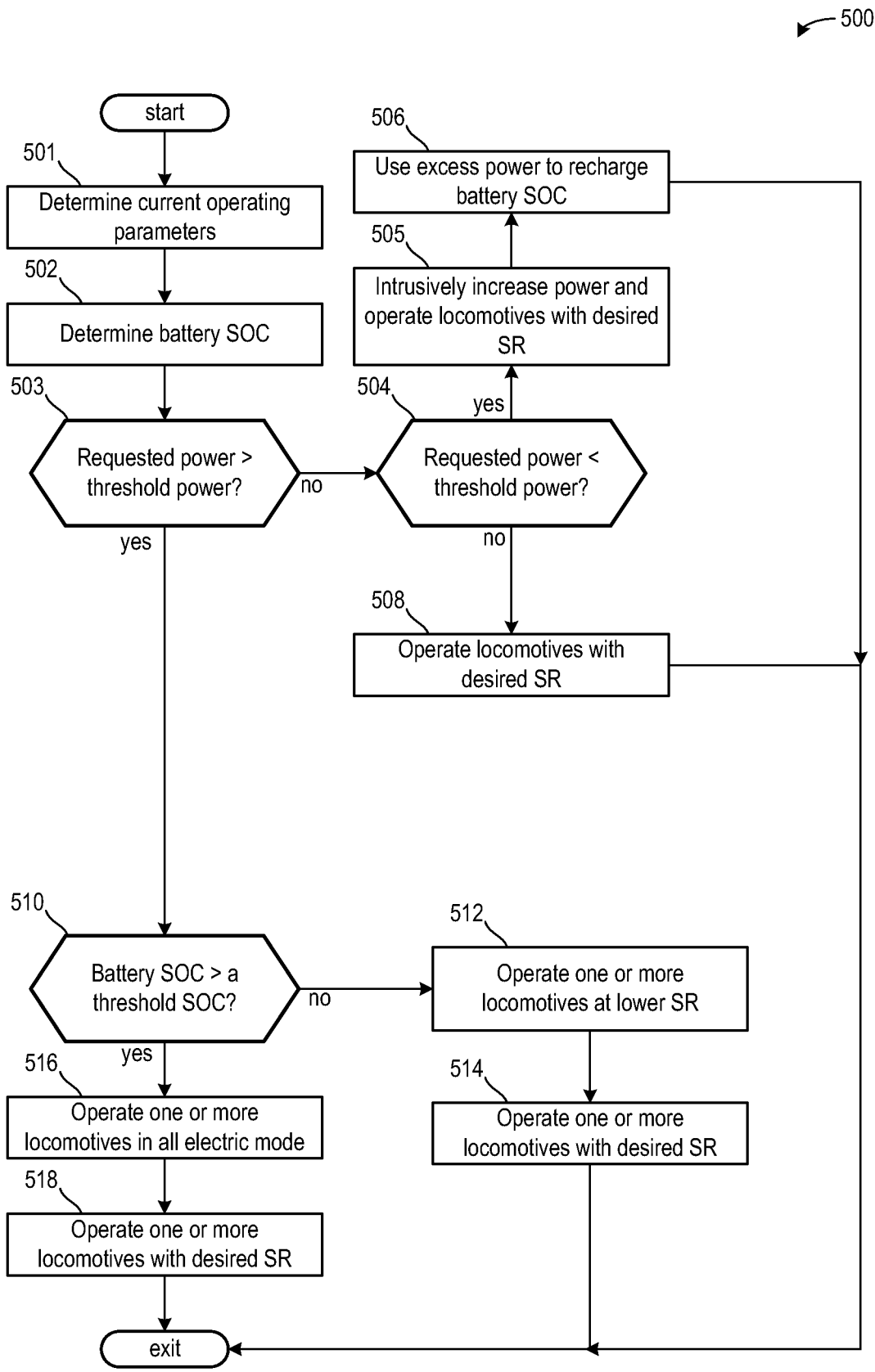
FIG. 5 shows a method for determining a mode in which to operate a consist in one of a plurality of modes in response to a state-of-charge (SOC) of an energy storage device thereof and a total requested power of the consist.
Figure 6:
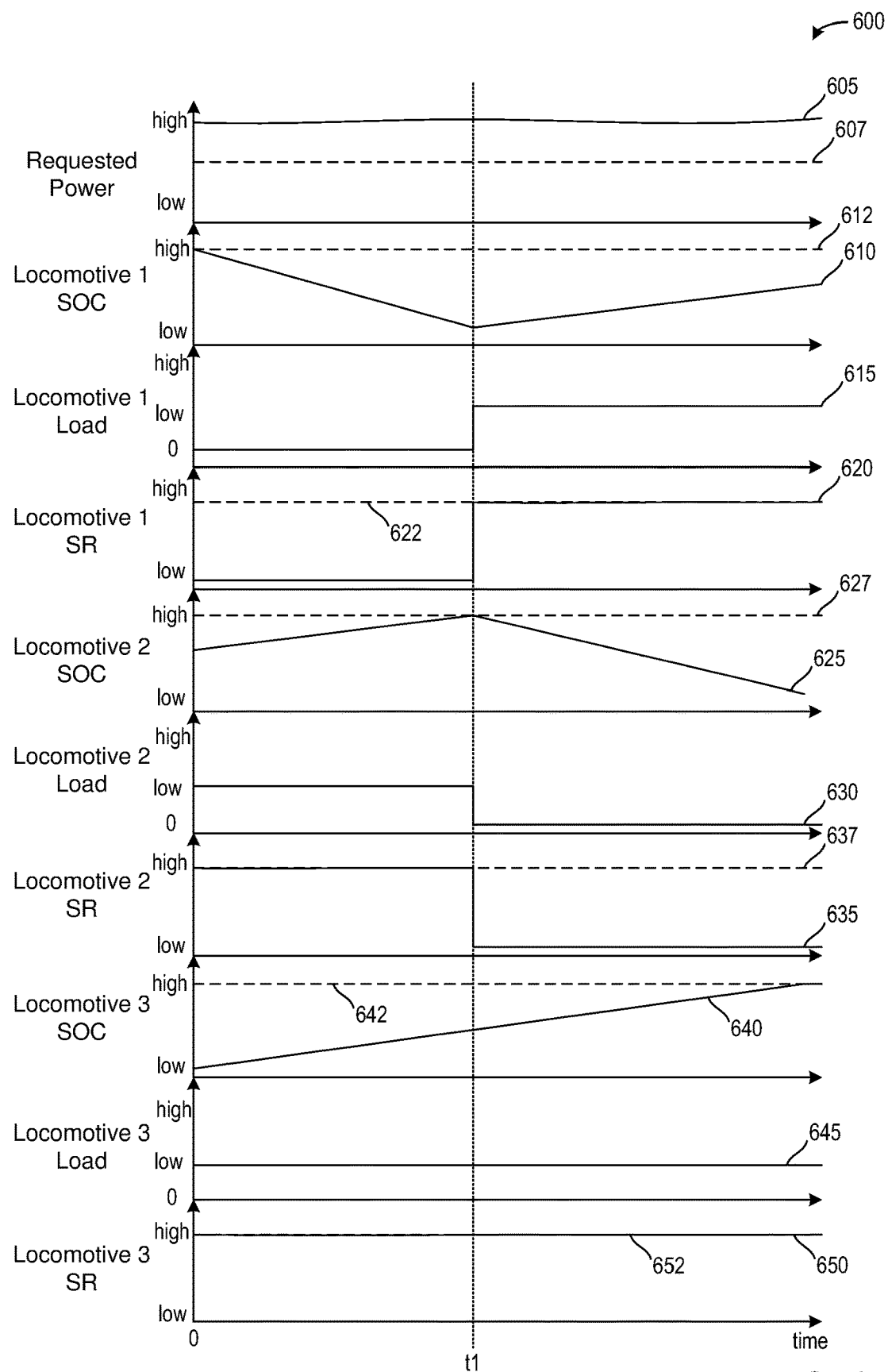
FIG. 6 shows a timeline illustrating adjusting an intake manifold temperature in response to an ammonia substitution ratio.

A more detailed view of a cylinder of the engine and injectors of the fuel system, is shown in FIG. 4. A controller of the vehicle system may use a plurality of different control strategies for selecting an operating mode in response to a total power request of a train. A method for selecting a first mode, a second mode, or a third mode is shown in FIG. 5. An engine operating sequence illustrating adjusting power generation in the rail vehicles of the trains is shown in FIG. 6.

Turning now to FIG. 4, it shows an example cylinder 401 of the engine. The cylinder may be one of a plurality of cylinders that each include at least one intake valve 403, at least one exhaust valve 405. Each of the plurality of cylinders may include at least one direct injector 412 and at least one port injector 422. Each fuel injector may include an actuator that may be actuated via a signal from the controller of the engine. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the direct injector may receive fuel from a first fuel system 410 via a first fuel conduit 411. The port-fuel injector may receive fuel from a second fuel system 420 via a second fuel conduit 421. The first fuel system may supply a carbon-containing fuel and the second fuel system may supply a carbon-free fuel, in one example. The carbon-containing fuel may include one or more of gasoline, diesel, biodiesel, natural gas, HDRD, ether, syn-gas, kerosene, and alcohol. The carbon-free fuel may include one or more of ammonia, hydrogen, and water. In some examples, the engine may be a spark-free engine. In other examples, the engine may be a spark-ignited engine.

In one example, the engine may combust one or more fuel types delivered thereto. For example, the direct injector may inject the first fuel directly to the cylinder and the port-fuel injector may inject a second fuel directly into an intake port 404. In one example, the first fuel is injected as a liquid fuel and the second fuel is injected as a gaseous fuel. The first fuel and second fuel may mix within an interior volume of the cylinder defined by cylinder walls, a cylinder head, and the piston 402. Following combustion, the exhaust valve may expel combustion products from the cylinder to an exhaust port 406.

During operation, each cylinder within the engine may use a four stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. A port-injection may occur during the intake stroke. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via adjusting one or more of an intake valve timing, a fuel injection timing, a fuel temperature, a fuel pressure, an engine speed, an engine load, an air temperature, an engine temperature, a spark-timing, and boost pressure and/or manifold pressure. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

Various surfaces of the engine, the cylinders, the intake manifold, and the exhaust manifold may be galvanized with a coating of zinc. Additionally or alternatively, the surfaces may be electrified. The surfaces may be galvanized due to exhaust gas constituents dissolving into water contained therein. For example, $CO_2$ and other CO compounds may dissolve into water along with $NO_x$ constituents. The CO and $NO_x$ constituents may protonate into acidic compounds, which along with the $CO_2$ may decrease a pH of the exhaust gas, thereby increasing an acidity of the exhaust gas. At certain EGR flow rates, the exhaust gas may be corrosive. The water content of the exhaust gas may be increased during operating conditions where hydrogen is being combusted. By galvanizing the engine, the corrosiveness of the exhaust gas may be tolerated.

A first fuel system may provide a first fuel via direct injectors to cylinders of the engine. A second fuel system may provide a second fuel via intake port injectors. A controller with instructions stored thereon may command adjustment of amounts of the second fuel injected by one or more of the injectors of the second fuel system based on one or more operating conditions described with respect to the methods below.

The engine system may have an EGR system for supplying exhaust gas into the cylinder. EGR is a system that selectively directs an amount of exhaust gas expelled from a cylinder and returned to into a cylinder of the engine for re-combustion. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage. The adjusted exhaust valve timing may include where an exhaust valve opening may overlap with an intake valve opening, resulting in a vacuum of the cylinder drawing expelled exhaust gases back into the cylinder. In this way, the EGR rate may be set via the donor cylinder(s), the adjusted exhaust valve timing, and/or valve position in the EGR passage.

Turning now to FIG. 5, a high-level flowchart shows a method 500 for determining a maximum substitution ratio based on conditions is shown. The method may be executed by a controller of a vehicle, such as the controller of FIGS. 1-4, based on instructions stored in a memory of the controller.

The method may begin at step 501, which includes estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed, a wheel speed, and/or a turbo shaft speed sensor, a torque sensor, a manifold pressure sensor, etc., as described above in reference to the vehicle system of FIGS. 1-4). Vehicle operating conditions may include engine speed and engine load, vehicle velocity, transmission oil temperature, exhaust gas flow rate, mass air flow rate, coolant temperature, coolant flow rate, engine oil pressures (e.g., oil gallery pressures), cylinder temperatures, operating modes of one or more intake valves and/or one or more exhaust valves, electric motor velocity, battery charge, engine torque output, vehicle wheel torque, and the like.

At step 502, the method may include determining a battery state-of-charge (SOC) for each rail vehicle of the train. The battery SOC may be determine via feedback from a voltage sensor coupled to an energy storage device, such as a battery. Additionally or alternatively, the battery SOC may be tracked over time by estimating charging and discharging thereof based on vehicle conditions.

At step 503, the method may include determining if a requested total train power is greater than a threshold power. The threshold power may be equal to a determined value based on equal power production via the rail vehicles. The threshold power may be a range, wherein engines of the rail vehicles are operated within a desired substitution ratio (SR) range. In one example, the requested total train power may be mapped at a start of a trip via the Trip Optimizer system.

If the requested consist power is not greater than the threshold power, then at step 504, the method may include determining if the requested power is less than the threshold power. If the requested power is less than the threshold power, then at step 505, the method may include intrusively increasing power generated. By doing this, the engines of the rail vehicles may be operated within the desired SR range.

At step 506, the method may include using excess power generated by the rail vehicles to recharge the battery SOC. In one example, if the battery SOC is equal to a fully charged SOC, then the method may include meeting the requested power with an electric motor. Once the battery SOC decreases to a lower predetermined value, which may be based on a percentage reduction of the fully charged SOC, then the operation may be switched to operating the engines at the desired SR range.

In some embodiments, additionally or alternatively, a number of vehicles with a power output intrusively increased may be based on a number of vehicles with a battery SOC less than a threshold SOC. For example, as the number of vehicles with the battery SOC being less than the threshold SOC increases, then the number of vehicles with the power output intrusively increased may also increase. By doing this, the multi-fuel engines may be operated more efficiently at the desired SR and the excess power may be supplied to the batteries to increase the SOC thereof, which may promote future all-electric or partially electric operation of the vehicle system. In this way, a complete operation of the vehicle system including the different operating modes described with respect to the method may decrease an overall emission value of the vehicle system.

If the requested power is not less than the threshold power, then at step 508, the method may include operating the rail vehicles within the desired SR range. The desired SR may be based on reduced carbon emissions while meeting a power demand along with other desired combustion conditions. In one example, the desired SR may include greater than 50% of a secondary fuel, such as hydrogen, and a remaining fueling met via a primary fuel, such as diesel. Operating all the rail vehicles at the desired SR may result in a total power output being equal to the requested total train power.

If the requested train power is greater than the threshold power, than at step 510, the method may include determining if the battery SOC is greater than a threshold SOC. The threshold SOC may be based on a full charge of the battery. Additionally or alternatively, the threshold SOC may be based on a lower SOC of the battery, where discharge below the lower SOC is undesired. As another example, the threshold SOC may be equal to an estimated SOC demanded to meet the requested total train power for a determined distance.

If the battery SOC is not greater than the threshold SOC, then at step 512, the method may include operating one or more of the rail vehicles at a SR lower than the desired SR. As such, an amount of diesel relative to an amount of hydrogen may increase at the lower SR. In one example, an amount of carbon-containing fuel may be increased at the lower SR relative to the desired SR and an amount of carbon-free fuel may be decreased at the lower SR relative to the desired SR.

At step 514, the method may include operating one or more of the rail vehicles with the desired SR. In one example, a second mode includes operating one or more of the rail vehicles at less than the desired SR and a remainder of the rail vehicles at the desired SR. The second mode does not include operating any of the rail vehicles in an all-electric mode due to a lack of electrical energy being available from a battery or capacitor bank.

Returning to step 510, if the battery SOC is greater than the threshold SOC, then at step 516, the method may include operating one or more vehicles in an all-electric mode. In one example, if the train includes three rail vehicles and the requested power is met via operating only one rail vehicle in the all-electric mode, then only the one rail vehicle is operated in the all-electric mode. In another example, additionally or alternatively, if the requested power is met via operating two rail vehicles in the all-electric mode, then only two rail vehicles are operated in the all-electric mode. In one example, a lowest number of rail vehicles of the train are operated in the all-electric mode to meet the requested power and a remainder may be operated at the desired SR. Operating in the all-electric mode may include increasing a load of an electric motor to a relatively high load and deactivating an engine. Deactivating the engine may include cutting a fuel supply to the engine.

At step 518, the method may include operating one or more rail vehicles with the desired SR. In one example, operating with the desired SR may include operating the engine at an idle load and meeting a fueling demand with more of a second fuel than a first fuel, wherein the second fuel is hydrogen and the first fuel is diesel. In one example, a third mode may include meeting the requested total power by operating one or more rail vehicles in an all-electric mode and operating a remainder of the rail vehicles at the desired SR to meet the requested total power. In some examples, additionally or alternatively, the requested total power may be met via the all-electric mode, wherein power generated from the combusting rail vehicles may be used to replenish the SOC of the energy storage devices of the train.

In some examples of the method, the third mode may include where engines of the remaining rail vehicles are deactivated if the SOC is full. Once the SOC is no longer full, the engine may be reactivated to replenish the SOC and prolong the all-electric operation while reducing carbon emissions.

In one example, additionally or alternatively, a method may include adjusting the SR and drawing power from the battery or supplying power to the battery. The SR may be adjusted to the desired SR while decreasing a vehicle efficiency or decreasing an efficiency of one or more of the fuels being combusted. The SR may be adjusted to maintain a tractive effort (e.g., requested vehicle power) and the SR within a desired range. Based on the requested vehicle power, the battery may provide electric power to the vehicle or be supplied with energy via excess power generated by an engine operating at the desired SR.

Turning now to FIG. 6, it shows a graph 600 illustrating a plurality of rail vehicle operating conditions during a trip. Plot 605 illustrates a requested power and plot 607 illustrates a threshold power. The threshold power is based on a total power generated via each rail vehicle of the train operating at a desired SR. Plot 610 illustrates a first rail vehicle SOC and dashed line 612 illustrates a threshold SOC. Plot 615 illustrates an engine load of the first rail vehicle. Plot 620 illustrates a SR of the first rail vehicle and dashed line 622 illustrates a desired SR. Plot 625 illustrates a second rail vehicle SOC and dashed line 627 illustrates the threshold SOC. Plot 630 illustrates an engine load of the second rail vehicle. Plot 635 illustrates a SR of the second rail vehicle and dashed line 637 illustrates a desired SR. Plot 640 illustrates a third rail vehicle SOC and dashed line 642 illustrates the threshold SOC. Plot 645 illustrates an engine load of the third rail vehicle. Plot 650 illustrates a SR of the third rail vehicle and dashed line 652 illustrates a desired SR. Time increases from a left to a right side of the figure.

Prior to t1, the requested total power is greater than the threshold total power. As such, one or more of the rail vehicles of the train may not be operated at a desired SR. To reduce carbon emissions, one or more of the rail vehicles is operated in an all-electric mode, wherein the total requested power is met via the all-electric mode. In the example of FIG. 6, the train includes three rail vehicles, wherein only the SOC of the first rail vehicle is greater than or equal to the threshold SOC prior to t1. As such, the first rail vehicle is operated in the all-electric mode, resulting in the SOC thereof being consumed. The second and third rail vehicles are operated at the desired SR. In one example, the engine load of the second and third rail vehicles is equal to a relatively low-load, such as an idle load. At the idle load, the second and third rail vehicles may replenish a SOC of their corresponding energy storage devices for upcoming all electric operation. In some examples, additionally or alternatively, the rail vehicles may replenish the SOC of energy storage devices of other rail vehicles. For example, the SOC of the first rail vehicle may be replenished by the second and third rail vehicles prior to t1.

At t1, the first rail vehicle SOC is relatively low and the second rail vehicle SOC is replenished to the threshold SOC. After t1, the all-electric mode is executed via the second rail vehicle. As such, the engine of the second rail vehicle is deactivated and the engine of the first rail vehicle is activated and operated at the desired SR. The first rail vehicle SR rate is equal to the desired SR and the SOC of the first rail vehicle increases.

In one example, the rail vehicles operating at the desired SR may include where a power output thereof may be higher than a demanded power output. For example, a total power output of the rail vehicles of the train may exceed the total requested power. The power from the rail vehicle operating in the all-electric mode may meet the total requested power and the power from the rail vehicles operating at the desired SR may be used to recharge energy storage devices thereof or of other rail vehicles, such as the rail vehicle operating in the all-electric mode.

The disclosure provides support for a method for a vehicle system having a multi-fuel engine and a battery including in a first mode of operation, adjusting a substitution ratio (SR) and drawing from the battery, and in a second mode of operation, supplying charge to the battery to maintain tractive effort and a desired SR. A first example of the method further includes where the second mode of operation further comprises a requested power being less than a threshold power, wherein supplying charge to the battery is proportional to the difference between the requested power and the threshold power. A second example of the method, optionally including the first example, further includes where in a third mode of operation, operating in an all-electric mode in response to a battery state of charge (SOC) being greater than a threshold charge or operating the multi-fuel engine at the desired SR in response to the battery SOC being less than or equal to the threshold charge. A third example of the method, optionally including one or more of the previous examples further includes where the vehicle system is a train comprising a plurality of vehicles, the method further comprising balancing power production of multi-fuel engines of the plurality of vehicles of the train in response to a requested power being equal to a threshold power so as to increase a number of vehicles of the plurality of vehicles operating at the desired SR. A fourth example of the method, optionally including one or more of the previous examples further includes where balancing power production of multi-fuel engines of the plurality of vehicles further comprises operating one or more locomotives at a SR lower than the desired SR. A fifth example of the method, optionally including one or more of the previous examples further includes where the multi-fuel engine is configured to combust a first fuel and a second fuel, wherein the first fuel is a carbon-containing fuel and the second fuel is a carbon-free fuel. A sixth example of the method, optionally including one or more of the previous examples further includes intrusively increasing power production of the multi-fuel engine in response to the requested power being less than the threshold power. A seventh example of the method, optionally including one or more of the previous examples further includes where excess power generated is used to increase a state-of-charge (SOC) of a battery. An eighth example of the method, optionally including one or more of the previous examples further includes where the excess power is equal to a difference between the requested power and the increased power production, wherein the charge supplied to the battery is proportional to the excess power. A ninth example of the method, optionally including one or more of the previous examples further includes where in response to the requested power being greater than the threshold power, meeting the requested power via an electric motor coupled to the battery.

The disclosure provides additional support for a system including a train comprising a plurality of vehicles, each vehicle of the plurality of vehicles comprising an engine and an electric motor and a controller with computer-readable instructions stored on non-transitory memory thereof that when executed enable the controller to in response to a requested power being less than a threshold power, intrusively increase a total power output of the plurality of vehicles to a value greater than the requested power, and recharge a state-of-charge (SOC) of at least one battery of the plurality of vehicles via excess power generated by the plurality of vehicles. A first example of the system further includes where the engine is a multi-fuel port fueled engine. A second example of the system, optionally including the first example, further includes where the engine is a multi-fuel engine configured to combust a first fuel and a second fuel, wherein the first fuel is direct injected and the second fuel is port injected, wherein the first fuel is a liquid fuel and the second fuel is a gaseous fuel. A third example of the system, optionally including one or more of the previous examples, further includes where the first fuel is diesel and the second fuel is hydrogen. A fourth example of the system, optionally including one or more of the previous examples, further includes where engines of the plurality of vehicles are operated at a desired SR when the requested power is less than the threshold power and the SOC is less than a full SOC. A fifth example of the system, optionally including one or more of the previous examples, further includes where meeting the requested power via the electric motor in response to the requested power being less than the threshold power and the SOC being equal to a full SOC.

The disclosure provides further support for a method for a train comprising a plurality of vehicles including operating at least one of the plurality of vehicles in an all-electric mode to meet a total requested power of the consist and operating a remaining plurality of vehicles at idle with a desired substitution ratio in response to a state-of-charge (SOC) of the at least one rail vehicle being less than a threshold SOC. A first example of the method further includes where the desired substitution ratio comprises two or more of gasoline, diesel, alcohol, ether, ammonia, hydrogen, natural gas, kerosene, and syn-gas. A second example of the method, optionally including the first example, further includes where in response to the SOC of all the rail vehicle being less than the threshold SOC, balancing power production of the plurality of vehicle and increasing a number of vehicles operating at the desired substitution ratio based on a number of vehicle operating at a substitution ratio less than the desired substitution ratio. A third example of the method, optionally including one or more of the previous examples, further includes where in response to the total requested power being less than a threshold power and a SOC of at least one rail vehicle being less than the threshold SOC, intrusively increasing power output of at least one multi-fuel engine of at least one vehicle of the plurality of vehicles to operate at the desired substitution ratio, further comprising supplying charge to a battery of the at least one rail vehicle proportional to a difference between a power generated and the total requested power.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The invention claimed is:

1. A method for a vehicle system having a multi-fuel engine and a battery, wherein the vehicle system is a train comprising a plurality of vehicles, the method comprising:
   in a first mode of operation, adjusting a substitution ratio (SR) and drawing charge from the battery;
   in a second mode of operation, supplying charge to the battery to maintain tractive effort and a desired SR, wherein the battery is configured to provide an electrical power to meet at least a portion of a requested power, the portion of the requested power separate from a power of the multi-fuel engine;
   balancing power production of multi-fuel engines of the plurality of vehicles of the train in response to the requested power being equal to a threshold power, wherein balancing power production of multi-fuel engines of the plurality of vehicles further comprises operating one or more locomotives at a SR lower than the desired SR; and
   increasing a number of vehicles of the plurality of vehicles operating at the desired SR.

2. The method of claim 1, wherein the second mode of operation further comprises the requested power being less than the threshold power, wherein supplying charge to the battery is proportional to the difference between the requested power and the threshold power.

3. The method of claim 1, further comprising in a third mode of operation, operating in an all-electric mode in response to a battery state of charge (SOC) being greater than a threshold charge or operating the multi-fuel engine at the desired SR in response to the battery SOC being less than or equal to the threshold charge.

4. The method of claim 1, wherein the multi-fuel engine is configured to combust a first fuel and a second fuel, wherein the first fuel is a carbon-containing fuel and the second fuel is a carbon-free fuel.

5. The method of claim 1, further comprising intrusively increasing power production of the multi-fuel engine in response to the requested power being less than the threshold power.

6. The method of claim 5, wherein excess power generated is used to increase a state-of-charge (SOC) of a battery.

7. The method of claim 6, wherein the excess power is equal to a difference between the requested power and the increased power production, wherein the charge supplied to the battery is proportional to the excess power.

8. The method of claim 1, further comprising in response to the requested power being greater than the threshold power, meeting the requested power via an electric motor coupled to the battery.

9. A system, comprising:
   a train comprising a plurality of vehicles, each vehicle of the plurality of vehicles comprising an engine and an electric motor, wherein the electric motor and the engine are coupled via a generator; and
   a controller with computer-readable instructions stored on non-transitory memory thereof that when executed enable the controller to:
      in response to a requested power being less than a threshold power, intrusively increase a power output of a number of vehicles such that a total power output of the plurality of vehicles increases to a value greater than the requested power; and
      recharge a state-of-charge (SOC) of at least one battery of the plurality of vehicles via excess power generated by the plurality of vehicles, wherein the at least one battery is configured to deliver an electrical power to the electric motor of at least one vehicle of the plurality of vehicles; and
      increasing the number of vehicles with the power output intrusively increased as a number of vehicles having a battery SOC less than a threshold SOC increases.

10. The system of claim 9, wherein the engine is a multi-fuel port fueled engine.

11. The system of claim 9, wherein the engine is a multi-fuel engine configured to combust a first fuel and a second fuel, wherein the first fuel is direct injected and the second fuel is port injected, wherein the first fuel is a liquid fuel and the second fuel is a gaseous fuel.

12. The system of claim 11, wherein the first fuel is diesel and the second fuel is hydrogen.

13. The system of claim 9, wherein engines of the plurality of vehicles are operated at a desired SR when the requested power is less than the threshold power and the SOC is less than a full SOC.

14. The system of claim 9, further comprising meeting the requested power via the electric motor in response to the requested power being less than the threshold power and the SOC being equal to a full SOC.

15. A method for a train comprising a plurality of vehicles, comprising:
- operating at least one of the plurality of vehicles in an all-electric mode to meet a total requested power of a consist; and
- operating a remaining plurality of vehicles at idle with a desired substitution ratio in response to at least one state-of-charge (SOC) of the plurality of vehicles being less than a threshold SOC.

16. The method of claim 15, wherein the desired substitution ratio comprises two or more of gasoline, diesel, alcohol, ether, ammonia, hydrogen, natural gas, kerosene, and syn-gas.

17. The method of claim 15, further comprising in response to each SOC of the plurality of vehicles being less than the threshold SOC, balancing power production of the plurality of vehicles and increasing a number of vehicles operating at the desired substitution ratio based on a number of vehicles operating at a substitution ratio less than the desired substitution ratio.

18. The method of claim 15, further comprising in response to the total requested power being less than a threshold power and the at least one SOC being less than the threshold SOC, intrusively increasing power output of at least one multi-fuel engine of at least one vehicle of the plurality of vehicles to operate at the desired substitution ratio, further comprising supplying charge to a battery of the at least one of the plurality of vehicles proportional to a difference between a power generated and the total requested power.

* * * * *